US007514500B2

(12) United States Patent  
Eldridge et al.

(10) Patent No.: US 7,514,500 B2
(45) Date of Patent: Apr. 7, 2009

(54) COMPLEXING RESINS AND METHOD FOR PREPARATION THEREOF

(75) Inventors: Robert James Eldridge, Glen Waverley (AU); Marck Norret, Fredericia (DK); Thomas W. Dahlke, Gundelfingen (DE); Mathew John Ballard, Glen Waverley (AU); Beryn John Adams, Hawthorn East (AU)

(73) Assignees: Commonwealth Scientific and Industrial Research Organization, Cambell, Australian Capital Territory (AU); Orica Australia Pty. Ltd., Melbourne Victoria (AU)

( * ) Notice: Subject to any disclaimer, the term of this patent is extended or adjusted under 35 U.S.C. 154(b) by 257 days.

(21) Appl. No.: 10/500,793

(22) PCT Filed: Jan. 8, 2003

(86) PCT No.: PCT/AU03/00015

§ 371 (c)(1),
(2), (4) Date: Jan. 31, 2005

(87) PCT Pub. No.: WO03/057739

PCT Pub. Date: Jul. 17, 2003

(65) Prior Publication Data
US 2005/0124707 A1 Jun. 9, 2005

(30) Foreign Application Priority Data
Jan. 8, 2002 (AU) .................................. PR9878

(51) Int. Cl.
C08F 2/44 (2006.01)
C08F 2/20 (2006.01)

(52) U.S. Cl. .................. 524/785; 524/458; 524/459; 524/460; 524/501; 524/502; 524/503; 524/505; 524/522

(58) Field of Classification Search ............. 524/458, 524/459, 460, 501, 502, 503, 505, 522, 785
See application file for complete search history.

(56) References Cited

U.S. PATENT DOCUMENTS

| 2,642,514 | A |   | 6/1953 | Herkenhoff |
| 2,697,724 | A |   | 12/1954 | Collier |
| 3,560,378 | A |   | 2/1971 | Weiss et al. |
| 3,808,305 | A |   | 4/1974 | Gregor |
| 3,996,131 | A |   | 12/1976 | Conn |
| 4,028,237 | A |   | 6/1977 | Nishimura et al. |
| 4,049,546 | A |   | 9/1977 | Rock |
| 4,123,396 | A |   | 10/1978 | Rembaum et al. |
| 4,144,373 | A | * | 3/1979 | Weiss et al. ............. 252/62.54 |
| 4,154,675 | A |   | 5/1979 | Jowett et al. |
| 4,207,397 | A |   | 6/1980 | Davis et al. |
| 4,269,760 | A |   | 5/1981 | Wakimoto et al. |
| 4,279,756 | A |   | 7/1981 | Weiss et al. |
| 4,289,617 | A |   | 9/1981 | Davis |
| 4,303,531 | A |   | 12/1981 | Kawabata et al. |
| 4,312,956 | A |   | 1/1982 | Chong et al. |
| 4,314,905 | A |   | 2/1982 | Etzel et al. |
| 4,329,225 | A |   | 5/1982 | Davis et al. |
| 4,447,475 | A |   | 5/1984 | Lubbock et al. |
| 4,473,474 | A |   | 9/1984 | Ostreicher et al. |
| 4,537,683 | A |   | 8/1985 | Isacoff et al. |
| 4,632,745 | A |   | 12/1986 | Giuffrida et al. |
| 4,648,976 | A |   | 3/1987 | Chen |
| 4,670,154 | A |   | 6/1987 | Carlson et al. |
| 4,673,504 | A |   | 6/1987 | Ostreicher et al. |
| 4,693,832 | A |   | 9/1987 | Hurst |
| 4,702,840 | A |   | 10/1987 | Degen et al. |
| 4,724,082 | A |   | 2/1988 | Boom |
| 4,734,200 | A |   | 3/1988 | Berry |
| 4,737,921 | A |   | 4/1988 | Goldwasser et al. |
| 4,804,465 | A |   | 2/1989 | Brown |

(Continued)

FOREIGN PATENT DOCUMENTS

AU           5270979           6/1980

(Continued)

OTHER PUBLICATIONS

Botto et al. (1985) "Continuous Ion Exchange Using Magnetic Micro-Resins—The Continuous Sirotherm Desalination Demonstration Plant," AWWW 1985 Int. Conf. Proc. :282-288.

(Continued)

Primary Examiner—Helen L Pezzuto
(74) Attorney, Agent, or Firm—Greenlee, Winner and Sullivan, P.C.

(57) ABSTRACT

The invention provides a process for preparing polymeric beads of complexing resin incorporating magnetic particles, which process comprises: producing a dispersion having a continuous aqueous phase and a dispersed organic phase, said organic phase comprising one or more polymerisable monomers, magnetic particles and a dispersing agent for dispersing said magnetic particles in the organic phase; polymerising said one or more polymerisable monomers to form polymeric beads incorporating said magnetic particles, wherein said polymeric beads include amine groups capable of complexing a transition metal cation, or wherein said polymeric beads are reacted with one or more compounds to provide amine groups capable of complexing a transition metal cation, complexing resins prepared by this process, and polymeric beads of complexing resin comprising a polymer matrix having magnetic particles dispersed substantially uniformly therein, wherein the polymer matrix incorporates amine groups capable of complexing a transition metal cation.

19 Claims, No Drawings

U.S. PATENT DOCUMENTS

| | | |
|---|---|---|
| 4,806,244 A | 2/1989 | Guilhem |
| 4,808,316 A | 2/1989 | Otomura et al. |
| 4,828,715 A | 5/1989 | Sander |
| 4,839,057 A | 6/1989 | White |
| 4,935,450 A | 6/1990 | Cone, Jr. |
| 4,952,386 A | 8/1990 | Davison et al. |
| 4,956,061 A | 9/1990 | Dempsey et al. |
| 5,043,072 A | 8/1991 | Hitotsuyanagi et al. |
| 5,120,688 A | 6/1992 | Hsieh |
| 5,128,041 A | 7/1992 | Degen et al. |
| 5,143,583 A | 9/1992 | Marchessault et al. |
| 5,149,437 A | 9/1992 | Wilkinson et al. |
| 5,152,896 A | 10/1992 | Mazet et al. |
| 5,182,023 A | 1/1993 | O'Connor et al. |
| 5,215,632 A | 6/1993 | Fritts et al. |
| 5,236,595 A | 8/1993 | Wang et al. |
| 5,248,424 A | 9/1993 | Cote et al. |
| 5,254,257 A | 10/1993 | Brigano et al. |
| 5,320,756 A | 6/1994 | Winston |
| 5,364,534 A | 11/1994 | Anselme et al. |
| 5,403,495 A | 4/1995 | Kust et al. |
| 5,449,522 A | 9/1995 | Hill |
| 5,464,530 A | 11/1995 | Stivers |
| 5,494,582 A | 2/1996 | Goodman |
| 5,547,585 A | 8/1996 | Shepherd et al. |
| 5,595,666 A | 1/1997 | Kochen et al. |
| 5,639,377 A | 6/1997 | Banham et al. |
| 5,707,514 A | 1/1998 | Yamasaki et al. |
| 5,728,302 A | 3/1998 | Connor et al. |
| 5,772,891 A | 6/1998 | Yamasaki et al. |
| 5,855,790 A | 1/1999 | Bradbury et al. |
| 5,876,685 A | 3/1999 | Krulik et al. |
| 5,900,146 A | 5/1999 | Ballard et al. |
| 5,932,099 A | 8/1999 | Cote et al. |
| 6,020,210 A | 2/2000 | Miltenyi |
| 6,027,649 A | 2/2000 | Benedek et al. |
| 6,045,694 A | 4/2000 | Wang et al. |
| 6,110,375 A | 8/2000 | Bacchus et al. |
| 6,120,688 A | 9/2000 | Daly et al. |
| 6,143,717 A | 11/2000 | Hill |
| 6,171,487 B1 | 1/2001 | Rousseau et al. |
| 6,171,489 B1 * | 1/2001 | Ballard et al. ............... 210/222 |
| 6,197,193 B1 | 3/2001 | Archer |
| 6,200,471 B1 | 3/2001 | Nohren, Jr. |
| 6,203,705 B1 | 3/2001 | James et al. |
| 6,267,892 B1 | 7/2001 | Wada et al. |
| 6,338,803 B1 | 1/2002 | Campbell et al. |
| 6,355,221 B1 | 3/2002 | Rappas |
| 6,372,143 B1 | 4/2002 | Bradley |
| 6,375,848 B1 | 4/2002 | Cote et al. |
| 6,416,668 B1 | 7/2002 | Al-Samadi |
| 6,436,297 B1 | 8/2002 | Lebeau et al. |
| 6,461,514 B1 | 10/2002 | Al-Samadi |
| 6,464,881 B2 | 10/2002 | Thoraval |
| 6,491,827 B1 | 12/2002 | Temple et al. |
| 6,517,723 B1 | 2/2003 | Daigger et al. |
| 6,565,748 B1 | 5/2003 | Wang et al. |
| 6,590,094 B2 * | 7/2003 | Karlou-Eyrisch et al. .. 536/25.4 |
| 6,613,232 B2 | 9/2003 | Chesner et al. |
| 6,669,849 B1 | 12/2003 | Nguyen et al. |
| 6,776,913 B1 | 8/2004 | Jangbarwala |
| 6,777,454 B2 | 8/2004 | Ritchie et al. |
| 6,783,681 B2 | 8/2004 | Mueller et al. |
| 6,824,685 B2 | 11/2004 | Katsu et al. |
| 6,864,397 B2 | 3/2005 | Kondo et al. |
| 6,926,832 B2 | 8/2005 | Collins et al. |
| 6,954,738 B2 | 10/2005 | Wang et al. |
| 6,982,037 B2 | 1/2006 | Horng et al. |
| 6,998,054 B2 | 2/2006 | Jangbarwala et al. |
| 7,025,884 B2 | 4/2006 | Mueller et al. |
| 2002/0106659 A1 | 8/2002 | Karlou-Eyrisch et al. |
| 2004/0050785 A1 | 3/2004 | Nguyen et al. |
| 2004/0140266 A1 | 7/2004 | Nguyen et al. |
| 2005/0224413 A1 | 10/2005 | Nguyen et al. |
| 2005/0237593 A1 | 10/2005 | Xu et al. |
| 2005/0274674 A1 | 12/2005 | Mueller et al. |

FOREIGN PATENT DOCUMENTS

| | | |
|---|---|---|
| AU | 60530/80 | 8/1980 |
| AU | 704376 | 4/1999 |
| AU | 705434 | 5/1999 |
| AU | 200181904 | 1/2002 |
| AU | 744706 | 2/2002 |
| AU | 749656 | 6/2002 |
| DE | 3938245 | 5/1991 |
| EP | 0117096 | 8/1984 |
| EP | 0522856 | 1/1993 |
| EP | 0540485 | 5/1996 |
| EP | 0605826 | 8/1997 |
| EP | 0779899 | 2/2000 |
| EP | 0781255 | 7/2000 |
| EP | 1303566 | 4/2003 |
| GB | 1559809 | 1/1980 |
| GB | 2273701 | 6/1994 |
| JP | 5949851 | 3/1984 |
| JP | 60132609 | 7/1985 |
| JP | 62141071 | 6/1987 |
| JP | 6-102709 | 4/1994 |
| JP | 09047761 | 2/1997 |
| JP | 11309354 | 11/1999 |
| WO | 9321114 | 10/1993 |
| WO | 9400237 | 1/1994 |
| WO | 9607615 | 3/1996 |
| WO | 9607675 | 3/1996 |
| WO | 9851622 | 11/1998 |
| WO | 9947456 | 9/1999 |
| WO | 0244091 | 6/2002 |
| WO | 03057739 | 7/2003 |
| WO | 03082748 | 10/2003 |
| WO | 2004087586 | 10/2004 |

OTHER PUBLICATIONS

Bursill et al. (1985) "The Effect of Natural Organics on Water Treatment," AWWA 11th Federal Conv. :197-204.

Chriswell et al. (1977) "Comparison of Macroreticular Resin and Activated Carbon as Sorbents," J. AWWW Dec. :669-674.

Derwent Abstract Accession No. 91-255202/35, HU To56-044-A, Villamosenergiaipari Ki, Jul. 29, 1991.

Galjaard et al. (2002) "Enhanced Pre-Coat Engineering (EPCE) for MF and UF: Steps to Full-Scale Application," Proc. IWA, ISSSN 0941-0961.

Laine et al. (2002) "Understanding Membrane Fouling: A Review of Over a Decade of Research," Proc. IWA, ISSN 0941-0961.

Lee et al. (2002) "Determination of Mass Transport Characteristics for Natural Organic Matter (NOM) in Ultrafiltration (UF) and Nanofiltration (NF) Membranes," Water Sci and Technol. 2(2):151-160.

Rook et al. (1979) "Removal of Trihalomethane Precursors from Surface Waters Using Weal Base Resins," Water Technol. Quality J. : 520-524.

Shim et al. (2002) "Effects of Natural Organic Matter and Ionic Strength on Membrane Surface Charge," J. Environmental Sci Technol. 366(17):3864-3871.

Swinton et al. (1983) "Continuous Ion Exchange Using Magnetic Microbeads—Field Trials of a Transportable Pilot Plant," AWWW 10th Federal Convention 30-1-30-14.

Symons et al. (1992) "The Use of Anion Exchange Resins for the Removal of Natural Organic Matter from Municipal Water," International Water Conference Water Conference, Proceedings Book :92-120.

Tilsley et al. (1978) "Ion Exchange in the Water Industry—Interaction of Organic Matter with Anion Resins," Chem. Industry :142-149.

AMIAD Turbocelan Filters, http://www.amiadusa.com, Non dated.

Amy et al. (1999) "Interactions Between Natural Organic Matter (NOM) and Membranes: Rejection and Fouling," Water Sci Technol. 40(9):131-139.

Ariza et al. (2002) "Effect of pH on Electrokinetic and Electrochemical Parameter of Both Sub-Layers of Composite Polyamide/Polysulfone Membranes," Desalination 148:377-382.

Bourke et al. (Apr. 1999) "Scale-up of the MIEX DOC Process for Full Scale Water Treatment Plants," Water Corporation of WA., 18th Federal Convention, Australian Water, and Wastewater Association, Proceedings 11-14, Adelaide Australia.

Brattebo et al. (1987) "Ion Exchange for the Removal of Humic Acids in Water Treatment," Wat. Res. 21 (9):1045-1052.

Brown et al. (1974) "Anion Exchange Resin Performance in the Treatment of River Trent Water," Effluent Water Treat. J. 14:417-422.

Chai et al. (1998) "Charged Polyacrylonitrile Membranes Having Amphiphilic Quaternized Ammonium Groups for Ultrafiltration," Appl. Poly. Sci. 69(9):1821-1828.

Childress et al. (2000) "Relating Nanofiltration Membrane Performance to Membrane Charge (Electrokinetic) Characteristics," Environ. Sci. Technol. 34:3710-3716.

Cho et al. (2000) "Membrane Filtration of Natural Organic Matter: Comparison of Flux Decline, NOM Rejection, and Foulants During Filtration with Three UF Membranes," Desalination 127:283-298.

Cho et al. (2000) "Membrane Filtration of Natural Organic Matter: Factors and Mechanisms Affecting Rejection and Flux Decline with Charged Ultra Filtration (UF)," J. Memb. Sci. 164:89-110.

Cho et al. (1998) "Characterization of Clean and Natural Organic Matter (NOM) Fouled NF and UF Membranes, and Foulants Characterization," Desalination 118:101-108.

Christy et al. (2002) "High-Performance Tangential Flow Filtration: A Highly Selective Membrane Separation Process," Desalination 144:133-136.

Derwent Abstract Accession No. 86-281075/43, JP 61-204080A, Tokuyama Soda KK, Sep. 10, 1986.

Derwent Abstract Accession No. 92-288534/35, JP 04-197435, Sumitomo Chem. Co Ltd, Jul. 17, 1992.

Drikas et al. (Non dated) "Operating the Miex Process With Microfiltration of Coagulation."

Drikas et al. (2002) "Removal of Natural Organic Matter—A Fresh Approach," Water Sci. Technol. 2(1):71-79.

Eldridge, R.J. (1995) "Moving-Bed Ion Exchange with Magnetic Resins," Rev. Chem. Eng. 11(3):185-228.

Feed Materials Production Center (Non dated) "Potential Exposure Pathways," http://www.atsdr.cdc.gov/HAC/PHA/fer/fer_p2d.html.

Fu et al. (1989) "Mechanistic Interactions of Aquatic Organic Substances with Anion-Exchange Resins," Aquatic Humic Resources, Am. Chem. Soc. :797-811.

Galjaard et al. (2005) "Influence of NOM and Membrane Surface Charge on UF-Membrane Fouling," http://www.iwaponline.com/wio/2005/04/wio200504001.htm.

Hach Webpage (Downloaded Jan. 5, 2006) Browse by Parameter, Test for: copper, http://www.hach.com.

Hach webpage (Downloaded Jan. 5, 2006) DR/4000 Procedure, Methods8506 and Method 8026, http://www.hach.com.

Harries et al. (1984) "Anion Exchange in High Flow Rate Mixed Beds," Effluent Water Treatment J. 24:131-139.

Hongve, D. (1989) "Anion Exchange for Removal of Humus from Drinking Water. Calcium Improves the Efficiency of the Process," Water Res. 23(11):1451-1454.

Kaiya et al. (2000) "Analysis of Organic Matter Causing Membrane Fouling in Drinking Water Treatment," Water Sci. Technol. 41(10-11):59-67.

Kavitskaya et al. (2003) "Adsorption of Anionic Surface Active Substances(SAS) on Charged Membranes" Desalination 158:225-230.

Kim et al. (Dec. 1991) "Using Anion Exchange Resins to Remove THM Precursors," Research and Technology J. AWWA 83:61-68.

Kim et al. (2003) "Evaluation of UF Membranes for Effective Effluent Organic Matter (EfOM) Removal with Hydrophilic Polymer Additives," AWWA Membrane Technology Conference.

Kunin et al. (1980) "Removal of Humic Material from Drinking Water by Anion Exchange Resins," Activated Carbon Absorption of Organics from the Aqueous Phase, vol. 2, Ann Arbor Science, Ann Arbor, pp. 425-441.

Lee et al. (2001) "Cleaning Strategies for Flux Recovery of An Ultra Filtration Membrane Fouled by Natural Organic Matter," Water. Resources 35(14):3301-3308.

MIEX DOC US Technical Brochure, Downloaded Jan. 5, 2006, http://www.miexresin.com.

Morran et al. (non dated) "Miex and Microfiltration—A Winning Alliance."

Morran et al. (1996) "A New Technique for the Removal of Natural Organic Matter," AWWA Watertec Convention, Sydney.

Morran et al. (Mar. 1997) "A Simple Method to Reduce Disinfection By-Product Formation," 17th Federal Convention, Australian Water and Wastewater Convention, Proceedings 16-21, Melbourne Australia, pp. 373-379.

Mysels, K.J. (1959) Introduction to Colloid Chemistry, Interscience Publishers, New York, pp. 345.

Naumczyk et al. (1989) "Organics Isolation from Fresh Drinking Waters by Macroporous Anion-Exchange Resins," Water Res. 23(12):1593-1597.

Nguyen et al. (Mar. 1997) "DOC Removal by Miex Process, Scaling-up and Other Development Issues," 17th Federal Convention, Austrialian Wastewater Association, Proceedings 16-21, Melbourne Australia, pp. 373-379.

Odegaard et al. (1989) "Removal of Humic Substances by Ion Exchange," Aquatic Humic Resources, Am. Chem. Soc. :813-834.

Slunjski et al. (Apr. 1999) "MIEX DOC Process—A New Ion Exchange Process," Australian Water Quality Centre, 18th Federal Convention, Australian Water and Wastewater Association, Proceedings 11-14, Adelaide Australia.

Stone et al. (1993) "Charged Micropourous Membranes," Microelectronics Applications Notes.

Thurman et al. (1989) "Separation of Humic Substances and Anionic Surfactants from Ground Water by Selective Absorption," Aquatic Humic Substances: Influence on Fate and Transformation of Pollutants, American Chemical Society :107-114.

van Breemen et al. (1979) "The Fate of Fluvic Acids During Water Treatment," Wat. Res. 13:771-779.

Wlimelech et al. (1996) Water treatment Technology Program Report No. 10, December, U.S. Department of the Interior, Bureau of Reclamation.

Xenopoulos et al. (2003) Abstract from the Meeting of the North American Membrane Society, Biomedical Applications/ Bioseparations section of May 19, 2003, http://www.che.utoledo.edu/nams/2003/viewpaper.cfm?ID=426, accessed May 28, 2004.

U.S. Appl. No. 11/124,624, Bourke et al.

Höll, Wolfgang H. "Fundamentals of Ion Exchange," Forschungszentrum Karlsruhe, Institute for Technology Chemistry: i-v, 1-140.

* cited by examiner

COMPLEXING RESINS AND METHOD FOR PREPARATION THEREOF

CROSS-REFERENCE TO RELATED APPLICATIONS

This application is a national stage filing of PCT/AU03/00015 under 35 U.S.C. 371 which claims priority to Australian Patent Application PR9878/02 filed 8 Jan. 2002, both of which are incorporated in their entirety herein to the extent not inconsistent herewith.

The present invention relates to complexing resins and in particular, to polymeric beads of complexing resin incorporating magnetic particles and processes for their preparation. The invention further relates to a method of separating transition metals from aqueous solutions using the complexing resin.

Ion exchange is widely used as a technique for removing both organic and inorganic species from water. Ion exchange techniques conventionally involve passing water through a packed bed or column of ion exchange resin. Target species are removed by being adsorbed on to the ion exchange resin. Ion exchange resins are commonly used for removing contaminants from water.

Industrial wastewaters and mine drainage, etc, are often contaminated with dissolved transition metal salts. Such metal contaminants must be removed before the water can be released to the environment because of the toxic effect most transition metals have on human beings and other living species. Increasingly, groundwater is becoming contaminated with transition metal compounds and requires similar treatment to comply with potable water guidelines. In such instances transition metal contaminants are typically removed by precipitation with lime, caustic soda, sodium sulfide, or similar reagents. However, this process yields a voluminous sludge that must be dewatered and disposed of in a secure landfill.

Ion exchange would be preferable to precipitation because it could recover the transition metal salts as an aqueous concentrate, which could potentially be recycled to a beneficial use. However, effective use of commercial ion exchange resins in such applications is currently not viable. In particular, most commercial resins are too slow to function effectively at short contact times. Treating substantial flows of water or liquid at adequate contact times requires very large columns and is therefore not economically feasible. Also, commercial resins typically have a poor capacity utilisation due to their low selectivity for transition metals over ever-present innocuous background ions.

Ion exchange resins incorporating dispersed magnetic particles have been described as suitable for applications involving continuous high flows. In the absence of shear, attraction between the magnetic particles in the resin causes the resin beads to flocculate and settle rapidly, enabling such resins to be readily separated under demanding process conditions. For such resins to operate effectively, the magnetic material should be incorporated in a manner that prevents its loss by erosion or dissolution during use. For this reason it is highly desirable that the magnetic material should be dispersed evenly throughout the polymeric bead. Improved mechanical strength is a further benefit of even particulate dispersion.

Processes for the manufacture of magnetic ion exchange resins have been described in some prior art patents. For example, U.S. Pat. No. 2,642,514, discloses an ion exchange process using a mixed ion exchange resin. One of the ion exchange resins is a magnetic resin. The magnetic resin is produced by polymerising a reagent mix until a viscous syrup is obtained. Magnetite is added to the viscous syrup and the mixture is agitated to mix in the magnetite. The mixture is cured to form a hard resin that is subsequently ground to form irregular particles of magnetic resin.

European Patent Application No. 0,522,856 also discloses the manufacture of magnetic ion exchange resins by grinding or crushing a polymer having magnetite dispersed throughout the polymer matrix. The processes for producing magnetic ion exchange resins disclosed in U.S. Pat. No. 2,642,514 and EP 0,522,856 require a grinding step, which increases the cost and complexity of the process and increases losses due to the formation of polymer particles outside the desired particle size range during the grinding step. Further, the ground particles are irregular in shape and easily abraded.

An alternative process for producing magnetic ion exchange resins is described in Australian Patent Application No. 60530/80. In this process, magnetic porous crosslinked copolymer particles are produced by a suspension polymerisation process. A mixture of polymerisable vinyl compounds, magnetic powder, polymerisation initiator and dispersion stabiliser is dispersed in water and polymerised.

A similar process for producing magnetic ion exchange resins is described in Japanese Patent Application No. 62141071. In this process an electron donor substance such as polyvinyl pyridine-styrene copolymer, polyacrylamide-styrene copolymer or polyvinyl imidazole copolymer is preferably added to the mixture in order to stabilise the dispersion of magnetic powder. According to the specification, the dispersion treatment is important for stabilising the dispersed state so that the rate of settling of the magnetic powder is reduced by breaking up magnetic particles which have clumped together in secondary or larger particles into primary particles. Furthermore, it is necessary to use dispersion equipment which differs from normal mixing equipment, with special mixers being required.

Many of the aforementioned difficulties associated with producing magnetic ion exchange resins can be overcome by using the process disclosed in Australian patent No. 704376. This patent describes an aqueous suspension polymerisation process which involves polymerising a dispersed organic phase comprising monomer, magnetic powder and a dispersing agent. During polymerisation the dispersing agent reacts with monomer to become covalently bound within the resin. By this process, spherical polymeric beads having an even distribution of magnetic powder throughout can be produced. The patent indicates that resins suitable for separating transition metals can be prepared by hydrolysis of poly(ethyl acrylate) beads, thereby providing a weak acid cation exchange resin.

While providing an effective process to prepare magnetic ion exchange resins, the resins contemplated in Australian patent No. 704376 are not particularly suitable for use in separating transition metals from aqueous solutions as they would have poor capacity utilisation due to their low selectivity for transition metals over innocuous background ions.

Commercial weak base resins, usually used as anion exchangers, provide means for the selective adsorption of transition metal salts over innocuous background ions, for example alkali and alkaline earth metals such as $Na^+$, $Ca^{2+}$ or $Mg^{2+}$, when used as complexing resins, in their free base form. However, such resins are not suited to continuous high flows. In particular, the resins would be difficult to recover from the treated water and their large size, typically 0.5-1.2 mm, provides a relatively slow adsorption rate, especially at low ion concentrations.

Accordingly, there is a need to develop complexing resins that are particularly suited to selectively removing transition metals from continuous high flows.

According to a first aspect the present invention provides a process for preparing polymeric beads of complexing resin incorporating magnetic particles, which process comprises: producing a dispersion having a continuous aqueous phase and a dispersed organic phase, said organic phase comprising one or more polymerisable monomers, magnetic particles and a dispersing agent for dispersing said magnetic particles in the organic phase; polymerising said one or more polymerisable monomers to form polymeric beads incorporating said magnetic particles, wherein said polymeric beads include amine groups capable of complexing a transition metal cation, or wherein said polymeric beads are reacted with at least one or more compounds to provide amine groups capable of complexing a transition metal cation.

In a second aspect the present invention provides polymeric beads of complexing resin comprising a polymer matrix having magnetic particles dispersed substantially uniformly therein, wherein the polymer matrix incorporates amine groups capable of complexing a transition metal cation.

The process of the present invention advantageously provides the ability to form spherical polymeric beads of complexing resin that have magnetic particles which are substantially evenly distributed throughout the polymeric beads. In addition, the present invention provides for the preparation of polymeric beads comprising complexing amine groups which are suitable as complexing resins and demonstrate an ability to selectively remove transition metals from aqueous solutions in the presence of innocuous background ions under continuous high flow conditions.

In accordance with the process of the present invention the organic phase is the dispersed phase. The organic phase includes one or more polymerisable monomers that polymerise to form the polymer matrix of the polymeric beads. It is preferred that the polymer matrix is a copolymer based on two (or more) monomers. Generally the polymeric beads will be prepared from two types of polymerisable monomers:

(a) crosslinking monomers which are able to provide crosslink points; and
(b) functional monomers which are able to provide functional groups.

By the process of the invention, the organic phase preferably includes crosslinking monomers and functional monomers. Some monomers, such as bis(diallylamino)alkanes or bis(acrylamidoethyl)amine can function as both crosslinking monomers and functional monomers. The functional monomers may be amine functionalised polymerisable monomers that provide the necessary amine groups to enable the polymeric beads to act as a complexing resin. The functional monomers may provide polymeric beads with sites that can be later reacted with one or more compounds to provide the necessary amine groups that will enable the polymeric beads to act as a complexing resin. The polymer matrix of the beads may be a copolymer matrix. Accordingly, other monomers may be included in the organic phase to copolymerise with the crosslinking monomers and the functional monomers, for example backbone monomers may be included.

The cross-linking monomers may be selected from a wide range of monomers, including divinyl monomers such as divinyl benzene, ethyleneglycol dimethacrylate or poly(ethyleneglycol) dimethacrylate or methylene bisacrylamide, ethyleneglycol divinylether and polyvinyl ester compounds having two or more double bonds, such as trimethylolpropane triacrylate or trimethacrylate. This list is not exhaustive.

A wide range of functional monomers may also be used in the process of the present invention. Suitable monomers include glycidyl methacrylate, vinyl benzyl chloride, methyl acrylate, N-vinyl formamide, dimethylaminoethyl methacrylate, aminopropyl acrylamide and methacrylamide, N,N-dimethylaminopropyl acrylamide and methacrylamide, vinyl pyridine and organic-soluble diallylamine or vinylimidazole salts. This list is not exhaustive.

The backbone monomers include any monomer polymerisable by free radicals such as styrene, vinyl toluene, methyl methacrylate and other acrylates and methacrylates. This list is not exhaustive.

In order to increase the efficiency of removal of transition metals from water being treated by the complexing resin, it is preferred that the polymeric beads are macroporous. This increases the total surface area of each bead available for contact. To produce macroporous polymeric beads according to the present invention, the dispersed phase should include one or more porogens. The porogen becomes dispersed throughout the droplets that form the dispersed phase, but the porogen does not take part in the polymerisation reaction. Accordingly, after the polymerisation reaction is completed, the porogen can be removed from the polymeric beads, for example by washing or steam stripping, to produce macroporosity in the polymeric beads.

Suitable porogens for use in the process of the present invention include aromatic compounds such as toluene and benzene, alcohols such as butanol, iso-octanol, cyclohexanol, dodecanol, isoamyl alcohol, tert-amyl alcohol and methyl iso-butyl carbinol, esters such as ethyl acetate and butyl acetate, saturated hydrocarbons such as n-heptane, iso-octane, halogenated solvents such as dichloroethane and trichloroethylene, plasticisers such as dioctylphthalate and dibutyl adipate, polymers such as polystyrene and polyvinyl acetate; and mixtures thereof. Mixtures of cyclohexanol with other porogens such as dodecanol or toluene have been found to be especially suitable for use as a porogen in the process of the present invention. It will be appreciated that the above list of porogens is not exhaustive and that the invention encompasses the use of other porogens and other combinations of porogens.

Incorporation of magnetic particles into the polymeric beads results in the beads becoming magnetic. Magnetic separation techniques may be used to conveniently separate the beads from a solution or liquid being treated. The magnetic particles used in this embodiment of the present invention may be any solid material that is magnetic. Examples include γ-iron oxide (γ-$Fe_2O_3$, also known as maghemite), magnetite ($Fe_3O_4$), chromium dioxide, other metal oxides and more exotic magnetic materials, such as those based on neodymium or samarium and other rare earth materials, for example samarium-cobalt or neodymium iron boride. Maghemite is especially preferred because it is inexpensive.

The magnetic material is added during the process in the form of particles and it may or may not be magnetised upon addition. The particle size of the particles may range up to a size that is up to one-tenth of the particle size of the polymeric beads formed in the process of the present invention. Particles that are larger than that may be difficult to evenly disperse into the polymeric beads. More preferably, the particles of magnetic material range in size from sub-micron (e.g. 0.1 μm) to 500 μm, most preferably from 0.1 μm to 10 μm.

The process of the present invention includes a dispersing agent for dispersing the magnetic particles in the dispersed phase. The dispersing agent acts to disperse the magnetic particles in the droplets of the dispersed phase to thereby form a stable dispersion (or suspension) of the magnetic particles in the dispersed phase. The dispersing agent also acts to promote a substantially even distribution of magnetic particles throughout the resultant polymeric beads. In this regard, the problem of erosion of the magnetic particles from the polymeric beads in service, as may happen if the magnetic particles were located only on the outer surface of the beads is avoided, or at least alleviated. Suitable dispersing agents will generally have a good binding affinity toward the surface of the magnetic particles and preferably should be able to chemically bond to the surface of the particles. The dispersing agent will also generally be soluble in the one or more polymerisable monomers. Preferably, the dispersing agent reacts with one or more of the monomers to become covalently bound within the polymer matrix. Use of a dispersing agent of this type not only results in a substantially even distribution of magnetic particles throughout the polymeric bead, but the particles also advantageously become more effectively bound within the bead through the dispersing agent being covalently bound to the polymer matrix. In this case, the problem of leaching of the magnetic particles from the polymeric beads can be avoided, or at least alleviated. Selection of the dispersing agent will typically depend upon the particular magnetic material and monomers being used. Persons skilled in the art should be able to readily select a suitable dispersing agent having regard to the specific reaction system employed.

The polymerisation reaction that takes place in the process of the present invention is a suspension polymerisation reaction and techniques known to those skilled in the art to control and monitor such suspension polymerisation reactions apply to the present invention. In order to maintain the dispersed phase in the form of a suspension of droplets in the continuous phase whilst avoiding aggregation of the droplets, a stabilising agent is preferably used. Suitable stabilising agents may include polyvinyl alcohol, polyvinyl pyrrolidone, gelatine, methyl cellulose or sodium polyacrylate. It is to be understood that the invention extends to cover any stabilising agent that may be suitable for use. The stabilising agent is typically present in an amount of 0.01 to 5% by weight, and preferably 0.05 to 2% by weight, based on the weight of the whole mixture.

It will also be generally necessary to use an initiator to initiate the polymerisation reaction. The initiator to be used depends upon the monomers present in the reaction mixture and the choice of initiator and the amount required will be readily apparent to the skilled addressee. By way of example only, suitable initiators include azoisobutyronitrile, benzoyl peroxide, lauroyl peroxide and t-butyl hydroperoxide. The amount of initiator used is generally in the range of 0.01 to 5 wt %, more preferably 0.10 to 1%, calculated on the total weight of monomer(s).

In a preferred embodiment of the present invention, the monomer mixture may include a functional monomer present in an amount of from 10 to 99% by weight, based upon the weight of total monomers, more preferably 50 to 90% by weight (same basis). The crosslinking monomers may be present in an amount of from 1 to 90% by weight, based on the weight of total monomers, more preferably 10 to 50% by weight (same basis). Additional monomers may be present in an amount of 0 to 60% by weight, more preferably 0 to 30% by weight, based on the weight of total monomers. The total monomers may constitute from 1 to 50%, more preferably 5 to 30% by weight of the whole suspension polymerisation mixture.

The magnetic particles are preferably added in an amount of from 10 to 300 wt %, based on the weight of total monomers, more preferably 20 to 100% by weight (same basis).

The dispersing agent is preferably added in an amount of 0.10 to 30% by weight, more preferably 1 to 10% by weight, based on the weight of magnetic particles.

The dispersion of the dispersed phase (which includes the monomer(s)) in the continuous phase is usually achieved by mixing the organic and aqueous phases and shearing the resulting mixture. The shear applied to the dispersion can be adjusted to control the size of the droplets of the dispersed phase. As the droplets of dispersed phase are polymerised to produce the polymeric beads, the shear applied to the dispersion largely controls the particle size of the polymeric beads. Generally, the polymeric beads are controlled to have a particle size in the range of 10-5000 µm.

Once a stable dispersion of dispersed phase in continuous phase is established, the polymerisation reaction is started by heating the dispersion to the desired reaction temperature. The dispersion may be held at the desired reaction temperature until the polymerisation reaction is substantially complete.

Depending upon the monomers used, once the polymerisation is complete, the resulting polymeric beads may include amine groups that will enable the polymeric beads to act as a complexing resin, the amine groups being provided by the polymerised residues of one or more of the functional monomers. Functional monomers capable of introducing amine functionality to the beads include, but are not limited to, dimethylaminoethyl methacrylate, aminopropyl acrylamide and methacrylamide, N,N-dimethylaminopropyl acrylamide and methacrylamide, vinyl pyridine, organic-soluble diallylamine or vinylimidazole salts.

Alternatively, once the polymerisation is complete, the resulting polymeric beads may require subsequent treatment to provide the amine groups that will enable the polymeric beads to act as a complexing resin. The particular treatment process used will be dependent on the composition of the polymeric beads to be treated. Generally, the treatment process will involve reacting the polymeric beads with one or more compounds that convert functional groups present on the beads to amine groups or reacting functional groups on the beads with one or more compounds that introduce amine groups to the beads.

In the treatment process where functional groups on the beads are converted to amine groups, various combinations of suitable functional groups and reactants may be employed, the nature of which would be known to those skilled in the art. It is preferable that the functional groups on the beads are amide groups and more preferable that the amide groups are introduced to the polymeric beads by way of an amide functional monomer. Exemplary amide functional monomers include, but are not limited to, N-vinyl formamide or N-methyl-N-vinyl acetamide. Amide groups can be readily converted to amine groups by hydrolysis, Hofmann degradation or borohydride reduction, hydrolysis is a preferred technique. For example, amide groups in N-vinylformamide or N-methyl-N-vinylacetamide monomer units can be converted to amine groups by hydrolysis.

In the treatment process where functional groups on the beads are reacted to introduce amine groups, various combinations of suitable functional groups and reacting compounds may be employed, the nature of which would be known to those skilled in the art. Preferred functional groups on the beads include, but are not limited to, halogens, epoxides, esters and amides. It is preferable that such functional groups are introduced to the polymeric beads by way of appropriate functional monomers. Exemplary functional monomers in this regard include, but are not limited to, vinyl benzyl chloride, glycidyl methacrylate, acrylate or methacrylate esters or amides. Such functional groups can be reacted with compounds that introduce amine groups. Suitable compounds include, but are not limited to, amines, diamines, and polyamine compounds and their respective salts. Preferred compounds for introducing amine groups include, but are not limited to, piperidine, N,N-diethylethylene diamine, dimethylamine, diethylamine, dimethylaminopropylamine, ethylenediamine, diethylenetriamine, polyethyleneimine and their respective salts.

The complexing properties of the polymeric beads will be primarily dictated by the nature of the amine groups present therein. Such amine groups should be readily accessible to undergo complexation with transition metal cations. It will be appreciated by those skilled in the art that amine groups to be included in the polymeric beads, either by direct polymerisation or by subsequent treatment, have little or no affinity to complex with alkali and alkaline earth metal cations, but can readily complex with transition metal cations. Those skilled in the art will also appreciate that the selection of amine groups to be included in the polymeric beads will be dependent on both the nature of the species to be separated and the nature of background ions present in the solution. For example, selectivity may be affected by factors such as steric crowding of the nitrogen atoms, electron density on the nitrogen atoms and the availability of multiple nitrogen atoms to form chelate complexes.

The beads may require cleaning prior to a subsequent treatment or prior to being used. This may be achieved by a sequence washing steps or by steam stripping the beads.

One method for cleaning the polymeric beads includes the following steps:
(a) add reaction product to a large excess of water, stir and allow to settle;
(b) separate beads from the supernatant;
(c) add separated beads to a large excess of water, stir and allow to settle before separating beads from the supernatant;
(d) repeat step (c) several times;
(e) disperse water washed beads in alcohol (ethanol);
(f) separate beads from alcohol and dry.

An alternative clean-up procedure is to steam strip the porogens and then wash the polymeric beads to remove any free solid particulate material.

In an especially preferred embodiment of the invention the polymeric beads are formed as a copolymer of glycidyl methacrylate and divinyl benzene. The monomers reside in the organic phase, which also includes a mixture of cyclohexanol with toluene or dodecanol as porogens. Polyvinyl alcohol is used as a stabilising agent. A free radical initiator such as "VAZO" 67 or Azoisobutyronitrile (AIBN) is added to the organic phase as a polymerisation initiator and γ-iron oxide is the magnetic material. The solid phase dispersing agent preferred for use in this system is a block copolymer of poly (hydroxystearic acid) and poly(ethyleneimine) and sold under the trade name SOLSPERSE 24000. This solid phase dispersing agent has a high binding affinity for the surface of the γ-iron oxide. It is believed that primary and secondary amino groups present in the dispersing agent provide this high binding affinity. Residual primary and secondary amino groups present in the dispersing agent are also believed to react with the epoxy group of the glycidyl methacrylate, while the vinyl groups from the methacrylate react with polymerising radicals to become covalently bound to the polymer matrix. All of the components of the organic phase are preferably pre-mixed in a separate tank and dispersed in water in the reaction tank. Once the polymerisation reaction is substantially complete, the resultant polymeric beads are subsequently reacted with an amine compound such as piperidine or N,N-diethylethylenediamine or their respective salts to produce a complexing resin. Reaction with the amine compound may be promoted or accelerated by heating.

In another aspect, the present invention provides a process which produces polymeric beads of complexing resin incorporating magnetic particles which further incorporate a toughening agent. The toughening agents are selected to increase the impact resistance of the resin. General techniques for increasing toughness of polymer materials may be readily employed in the process of the present invention to afford polymeric beads with increased durability. For example, rubber toughening agents may be used to improve the strength and durability of glycidyl methacrylate-based polymeric beads. The use of these rubber toughening agents is believed to result in improved durability and an increased service life of the polymeric beads. The rubber toughening agents include low molecular weight rubbers which may be incorporated into the dispersed phase. A particularly preferred rubber toughening agent is sold under the trade designation Kraton D1102 although other commercially available rubber toughening agents can be used.

In another aspect, the present invention provides a method of separating transition metal ions from an aqueous solution comprising contacting said solution with polymeric beads of complexing resin according to the present invention. The metal-loaded beads may then be magnetised, causing them to aggregate and settle out of the treated solution. Alternatively, they can be separated on a wet high intensity magnetic separator or magnetic drum separator or similar device.

As mentioned above the polymeric beads of complexing resin of the present invention are preferably macroporous. The particle size of the polymeric beads is preferably within the range of 30 µm to 1000 µm. The particles of solid material may have a particle size in the range of sub-micron (e.g. 0.1 µm) to 500 µm and more preferably from 0.1 µm to 10 µm.

The dispersing agent is a chemical compound or species that can react with at least one of the monomers used to produce the polymer matrix such that the dispersing agent is covalently bound within the polymer matrix. Further, the dispersing agent should have a good affinity for the surface of the magnetic particles and preferably should be able to chemically bond to the surface of the magnetic particles. The use of such an agent allows the magnetic particles to be dispersed throughout the polymer matrix.

As the magnetic particles are dispersed throughout the polymeric beads of the present invention, the magnetic particles are not easily removed from the beads and this allows the beads to be subjected to a number of handling operations, such as conveying, pumping and mixing, without substantial erosion of solid particles therefrom.

The invention will be further described with reference to the following non-limiting Examples.

EXAMPLE 1

Preparation of Piperidine Functionalised Magnetic Macroporous Complexing Resin

Magnetic macroporous complexing resins were prepared in accordance with the process of the present invention using the following raw materials:
1. Water: this is the continuous medium in which the organic phase is dispersed and then reacted.

2. Gohsenol® GH 20 (available from Nippon Gohsei) this is a high molecular weight polymeric surfactant, a polyvinyl alcohol, that disperses the organic phase in the water as droplets.
3. Kraton D1102 (available from Shell Chemical Company): this acts to improve the strength and durability of the resin.
4. Cyclohexanol: this is the major porogen: it is a solvent for the monomers, but a non-solvent for the polymer, and it promotes the formation of voids and internal porosity in the resin beads.
5. Toluene: this is the minor porogen.
6. Solsperse® 24000 (available from Avecia Pigments & Additives): it is a solid phase dispersing agent and is a block copolymer of poly(hydroxystearic acid) and poly (ethyleneimine).
7. Pferrox® 2228HC γ-$Fe_2O_3$ (available from Pfizer): gamma-iron oxide (maghemite). This is the magnetic oxide that makes the resin beads magnetic.
8. DVB-50 (divinyl benzene): this is the monomer that crosslinks the beads.
9. GMA (glycidyl methacrylate): this monomer is polymerised to form part of the polymer matrix. The polymerised residue of the monomer provides epoxy groups within the matrix that can be subsequently reacted to produce a complexing resin as follows:

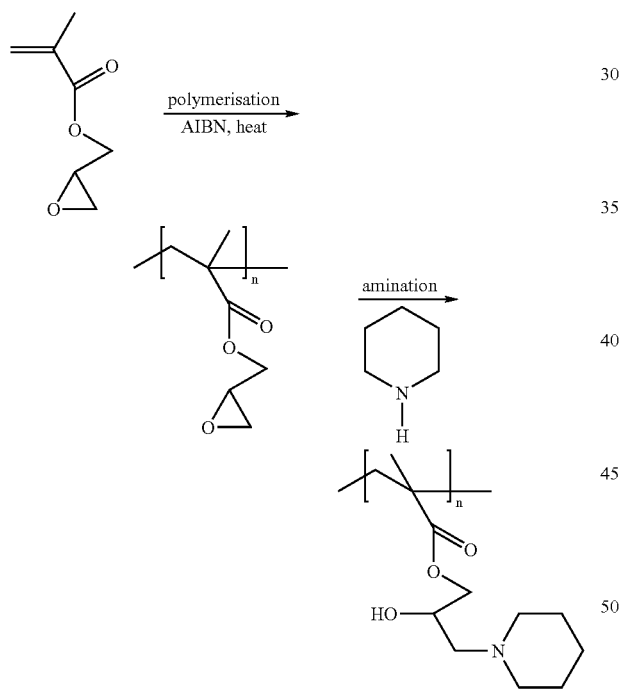

10. VAZO® 67 (available from Dupont): this is the polymerisation initiator, which activates when the mixture is heated above 75° C.
11. Piperidine: this is the amine that reacts with the epoxy group provided by the polymerised residue of glycidyl methacrylate to form complexing groups.
12. Ethanol: this is used as a rinse and as a wetting agent.

Method

Toluene (1.4 kg), cyclohexanol (5.5 kg) and Solsperse 24000 (2.5 kg) were charged to a mix tank. The solution was then stirred slowly with a Cowles-type dispersing blade while Pferrox 2228 HC γ-$Fe_2O_3$ (13 kg) was added. The speed was increased and held for a time sufficient to break up the large aggregates. This mix was then passed through a closed-head bead mill with sufficient residence time to ensure that the majority of the particles were smaller than 5 μm in size. In a separate mix tank, toluene (2.6 kg), cyclohexanol (1.6 kg) and Kraton D1102 (1 kg) were added and stirred until the rubber had dissolved. The solution of rubber was then added to the pigment dispersion and mixed until it was homogeneous.

Water (110 L) was charged to a 250 L reactor and the stirrer and nitrogen purge started. Next Gohsenol® GH-20 (400 g) was added, and the water phase heated to 80° C. to dissolve the surfactant. While the water was heating the prepared pigment and rubber solution was charged to a separate stirred mix tank and the stirrer turned on. Glycidyl methacrylate (21 kg), divinylbenzene (5.2 kg) and cyclohexanol (14 kg) were added in turn. A solution of Vazo 67 (100 g) in toluene (100 g) was then added, and the mixture was stirred for a further five minutes before adding it to the heated water phase. The resulting dispersion was held at 80° C. (±5° C.) for two hours, during which time polymerisation occurred and solid resin beads (44 kg) were formed.

The resultant beads contained 25% by weight of γ-$Fe_2O_3$ and had a mean particle diameter of 225 μm, with a standard deviation of 100 μm. A portion of this resin was cleaned of the excess γ-$Fe_2O_3$ and organic solvent by repeated cycles of washing, settling and decanting. 50 mL (16 g) of this resin was then slurried in 100 mL of water and heated to 85° C. Piperidine (6.8 g, 80 mmol) was added and the mixture heated at 85° C. under nitrogen for four hours. The beads were then washed and a sample dried under vacuum at 60° C. and weighed. Wet resin was treated successively with 1 M sodium chloride solution acidified to pH 1; water; 0.2 M potassium nitrate solution; water; 0.1 M sodium hydroxide solution; water; neutral 1 M sodium chloride solution; water; 0.2 M potassium nitrate solution. The chloride ions displaced by potassium nitrate were titrated with silver nitrate, yielding a total capacity of 2.11 meq/g and a strong base capacity of 0.10 meq/g. The weak base capacity is therefore 2.01 meq/g.

The maghemite was well dispersed throughout the resin beads produced in this Example.

EXAMPLE 2

Preparation of N,N-diethylethylene Diamine Functionalised Magnetic Macroporous Complexing Resin Magnetic macroporous complexing resins were prepared in a similar fashion to Example 1, except the solid resin beads (16 g) were aminated with N,N-diethylethylene diamine (DEDA, 9.3 g, and 80 mmol) instead of piperidine.

EXAMPLE 3

Evaluation of Copper Uptake as a Function of pH by Complexing Resin Prepared in Example 1

The complexing performance of resin prepared in Example 1 was assessed by measuring copper uptake as a function of pH. The resin sample was treated with 1 M sodium hydroxide solution to ensure that weak base groups were in the free base form, then rinsed with water. Samples were equilibrated with copper (II) sulfate solutions initially containing 0.5 mmol Cu(II) per meq of weak base capacity and ranging in pH from 2 to 5. The uptake of copper varied from 0.17 mmol per gram of resin at pH 2 to 0.43 mmol/g at pH5 as shown in Table 1. (At higher pH copper hydroxide precipitated).

TABLE 1

| pH | Copper Uptake (mmol/g) |
|---|---|
| 2 | 0.17 |
| 3 | 0.18 |
| 4 | 0.34 |
| 5 | 0.43 |

EXAMPLE 4

Evaluation of Copper Uptake by Complexing Resin Prepared in Example 2 in the Presence or Absence of $MgSO_4$ The complexing performance and chelate selectivity of the resin prepared in Example 2 was assessed by measuring copper uptake as a function of copper concentration, in solutions with and without magnesium sulfate. The resin was treated with 1 M NaOH and rinsed. Samples were then equilibrated at pH with $CuSO_4$ having initial concentrations ranging from 1 to 40 mM. The experiment was repeated with a second series of $CuSO_4$ solutions, which also contained magnesium sulfate at a concentration of 27 mM. The uptakes of copper in the two experiments were very similar, reaching approximately 0.22 mmol/g at equilibrium $CuSO_4$ concentrations above 13 mM (Table 2). More than 90% of the adsorbed copper was desorbed in about 15 bed volumes of 0.1 M hydrochloric acid. The required volume of acid decreases with increasing acid concentration, with slight losses of iron oxide from the beads at high concentration.

TABLE 2

| Copper Concentration (mmol/L) | Copper Uptake no $MgSO_4$ (mmol/g) | Copper Uptake with $MgSO_4$ (mmol/g) |
|---|---|---|
| 0.01 | — | 0.03 |
| 0.06 | 0.08 | — |
| 0.07 | — | 0.11 |
| 0.12 | 0.05 | — |
| 0.18 | — | 0.08 |
| 0.20 | — | 0.135 |
| 0.31 | 0.125 | — |
| 2.74 | 0.195 | — |
| 3.42 | — | 0.19 |
| 11.0 | 0.23 | — |
| 13.4 | — | 0.225 |
| 28.6 | 0.26 | — |

EXAMPLE 5

Evaluation of Zinc and Cadmium Uptake by Complexing Resins Prepared in Examples 1 and 2

The uptake of zinc and cadmium by resins prepared in Examples 1 and 2 were evaluated. The resins from Examples 1 and 2, after treatment with 1 M NaOH solution, were equilibrated with zinc sulfate and cadmium sulfate solutions having initial concentrations ranging from 1 to 40 mM. At pH 6 and equilibrium $ZnSO_4$ concentrations about 6 mM the piperidineresin adsorbed 0.22 and the DEDA resin 0.3 mmol Zn/g. Maximum cadmium uptakes were 0.29 and 0.35 mmol/g. Both resins were more than 90% regenerated with 12-18 bed volumes of 0.1 M HCl.

EXAMPLE 6

Comparison of the Uptake Rate of Complexing Resins Prepared in Examples 1 and 2 with a Commercial Complexing Resin The uptake rates of resins prepared in Examples 1 and 2 were evaluated and compared with values obtained using a commercial polyamine complexing resin (Fuji PEI-CS-07). Resins from Example 1 and 2 (40 mL), after treatment with 1 M NaOH solution, were suspended in 50 mL of water with continuous stirring and $CuSO_4$ or $CdSO_4$ (0.5 mol per mol of weak base group) added. The disappearance of metal ions was monitored as a function of time. For comparison the copper uptake experiments were repeated with the commercial polyamine resin Fuji PEI-CS-07. The piperidine-functionalised resin removed 50% of the added copper in 30 seconds at pH 5 and essentially all of it in less than 50 minutes (Table 3). Uptake of cadmium at pH 6 reached 50% in about 15 seconds and 95% after about 45 minutes (Table 4). Uptake of copper on the DEDA-functionalised resin at pH 5.4 reached 50% in less than 30 seconds and essentially 100% in less than an hour (Table 5). In contrast, the commercial resin adsorbed only 35% of the copper in one hour and had not reached equilibrium after 72 hours (Table 6).

TABLE 3

| Time (min) | Fraction of Copper Remaining ($[Cu]/[Cu]_0$) |
|---|---|
| 0 | 1 |
| 1 | 0.212 |
| 5 | 0.176 |
| 10 | 0.061 |
| 15 | 0.049 |
| 30 | 0.017 |
| 45 | 0.00 |

TABLE 4

| Time (min) | Fraction of Cadmium Remaining ($[Cd]/[Cd]_0$) |
|---|---|
| 0 | 1 |
| 5 | 0.101 |
| 10 | 0.088 |
| 30 | 0.060 |
| 45 | 0.055 |
| 60 | 0.041 |

TABLE 5

| Time (min) | Fraction of Copper Remaining ($[Cu]/[Cu]_0$) |
|---|---|
| 0 | 1 |
| 1 | 0.19 |
| 5 | 0.10 |
| 10 | 0.077 |
| 15 | 0.039 |
| 30 | 0.019 |
| 45 | 0.015 |
| 60 | 0.007 |
| 120 | 0.010 |

TABLE 5-continued

| Time (min) | Fraction of Copper Remaining ($[Cu]/[Cu]_0$) |
|---|---|
| 300 | 0.007 |
| 430 | 0.002 |

TABLE 6

| Time (min) | Fraction of Copper Remaining ($[Cu]/[Cu]_0$) |
|---|---|
| 0 | 1 |
| 5 | 0.92 |
| 10 | 0.82 |
| 15 | 0.87 |
| 30 | 0.74 |
| 45 | 0.68 |
| 60 | 0.64 |
| 120 | 0.56 |
| 210 | 0.53 |
| 1200 | 0.59 |

It will be appreciated that the invention described herein is susceptible to variations and modifications other than those specifically described. It is to be understood that the invention encompasses all such variations and modifications that fall within the spirit and scope.

Throughout this specification and the claims which follow, unless the context requires otherwise word "comprise", and variations such as "comprises" and "comprising", will be understood to imply the inclusion of a stated integer or step or group of integers or steps but not the exclusion of any other integer or step or group of integers or steps.

The invention claimed is:

1. Polymeric beads of complexing resin comprising a polymer matrix having magnetic particles and a dispersing agent dispersed substantially uniformly therein, wherein the polymer matrix incorporates amine groups that are complexed with transition metal cation.

2. The polymeric beads of claim 1, wherein the dispersing agent is covalently bound within the polymeric matrix.

3. The polymeric beads of claim 1 prepared by a process which comprises:
   (a) producing a dispersion having a continuous aqueous phase and a dispersed organic phase, said organic phase comprising one or more polymerizable monomers, magnetic particles and a dispersing agent for dispersing said magnetic particles in the organic phase; polymerizing said one or more polymerizable monomers to form polymeric beads incorporating said magnetic particles, wherein said polymeric beads include amine groups that are capable of complexing a transition metal cation and that are provided by polymerized residues of said one or more polymerizable monomers, or wherein said polymeric beads are reacted with one or more compounds to provide amine groups capable of complexing a transition metal cation; and
   (b) contacting the so-formed polymeric beads with an aqueous solution comprising transition metal cations such that the amine groups of the beads complex with transition metal cations.

4. The polymeric beads according to claim 3 wherein the organic phase comprises two or more monomers.

5. The polymeric beads according to claim 3 wherein said one or more polymerizable monomers are selected from:
   (a) crosslinking monomers which are able to provide crosslink points; and
   (b) functional monomers which are able to provide functional groups.

6. The polymeric beads according to claim 5 wherein said functional monomer provides amine groups capable of complexing a transition metal cation.

7. The polymeric beads according to claim 6 wherein said functional monomer provides amine groups selected from dimethylaminoethyl methacrylate, aminopropyl acrylamide and methacrylamide, N,N-dimethylaminopropyl acrylamide and methacrylamide, vinyl pyridine, organic-soluble diallylamine and vinylimidazole salts.

8. The polymeric beads according to claim 5 wherein said functional monomer includes a functional group capable of reaction with one or more compounds to provide said amine groups capable of complexing a transition metal cation.

9. The polymeric beads according to claim 8 wherein said functional monomer capable of providing amine groups includes an amide group.

10. The polymeric beads according to claim 9 wherein said functional monomer including an amide group is selected from N-vinyl formamide and N-methyl-N-vinyl acetamide.

11. The polymeric beads according to claim 8 wherein said functional monomer capable of providing amine groups includes an epoxy group.

12. The polymeric beads according to claim 11 wherein said functional monomer including an epoxy group is glycidyl methacrylate.

13. The polymeric beads according to claim 8 wherein said functional monomer capable of providing amine groups is a vinyl ester.

14. The polymeric beads according to claim 13 wherein said vinyl ester is selected from acrylate and methacrylate esters.

15. The polymeric beads according to claim 14 wherein the acrylate ester is methyl acrylate.

16. The polymeric beads according to claim 3 wherein said one or more polymerizable monomers further includes one or more back bone monomers.

17. The polymeric beads according to claim 3 wherein said dispersed organic phase further comprises a porogen.

18. The polymeric beads according to claim 1 wherein the magnetic particles are selected from γ-iron oxide, magnetite and chromium dioxide.

19. The polymeric beads according to claim 3 wherein the dispersion is stabilized using a stabilizing agent.

* * * * *

UNITED STATES PATENT AND TRADEMARK OFFICE
CERTIFICATE OF CORRECTION

PATENT NO. : 7,514,500 B2  Page 1 of 1
APPLICATION NO. : 10/500793
DATED : April 7, 2009
INVENTOR(S) : Robert James Eldridge et al.

It is certified that error appears in the above-identified patent and that said Letters Patent is hereby corrected as shown below:

On the Title page:

Left column, (73) name of the first Assignee, replace "Commonwealth Scientific and Industrial Research Organization" with "Commonwealth Scientific and Industrial Research Organisation"

Left column, (73) city of record for Assignee Commonwealth Scientific and Industrial Research Organization, replace "Cambell" with "Campbell"

Signed and Sealed this

Thirtieth Day of June, 2009

JOHN DOLL
*Acting Director of the United States Patent and Trademark Office*